(12) United States Patent
Bellamkonda et al.

(10) Patent No.: US 12,493,631 B1
(45) Date of Patent: Dec. 9, 2025

(54) HANDLING DATA SKEW FOR PARALLEL EXECUTION WITH SERVER MAPPING PLANS

(71) Applicant: Oracle International Corporation, Redwood Shores, CA (US)

(72) Inventors: Srikanth Bellamkonda, Mountain View, CA (US); Madhuri Kandepi, San Mateo, CA (US); Yash Shah, San Mateo, CA (US); Shuo Chen, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/821,805

(22) Filed: Aug. 30, 2024

(51) Int. Cl.
| | |
|---|---|
| *G06F 16/20* | (2019.01) |
| *G06F 16/2453* | (2019.01) |
| *G06F 16/2455* | (2019.01) |
| *G06F 16/27* | (2019.01) |
| *H04L 67/1008* | (2022.01) |

(52) U.S. Cl.
CPC ...... *G06F 16/278* (2019.01); *G06F 16/24542* (2019.01); *G06F 16/2456* (2019.01); *H04L 67/1008* (2013.01)

(58) Field of Classification Search
CPC ........... G06F 16/24542; G06F 16/2456; G06F 16/278; H04L 67/1008
See application file for complete search history.

(56) References Cited

U.S. PATENT DOCUMENTS

| | | |
|---|---|---|
| 6,529,896 B1 | 3/2003 | Leung et al. |
| 9,183,254 B1 | 11/2015 | Cole |
| 2006/0026115 A1 | 2/2006 | Ahmed |
| 2006/0101001 A1 | 5/2006 | Lindsay |
| 2007/0075853 A1* | 4/2007 | Griffin .................... G01S 17/89 340/518 |
| 2007/0250473 A1 | 10/2007 | Larson |
| 2009/0182720 A1 | 7/2009 | Cain et al. |
| 2011/0055246 A1 | 3/2011 | Le Biannic et al. |
| (Continued) | | |

OTHER PUBLICATIONS

U.S. Appl. No. 14/033,358, filed Sep. 20, 2013, Office Action.

(Continued)

*Primary Examiner* — Diedra McQuitery
(74) *Attorney, Agent, or Firm* — Hickman Becker Bingham Ledesma LLP; Stephen R. Tkacs

(57) ABSTRACT

Skew handling techniques are provided in parallel execution for even load balancing and scaling. In a compile-time solution, a dynamic sampling query is issued to detect partition skew. The compile-time solution determines the number of skewed partitions and uses a hybrid distribution scheme where skewed partitions use a random distribution and non-skewed partitions use the original server mapping. In a runtime solution, producer server processes create partition mapping vectors that contain partition mapping information. Each producer server process sends its partition mapping vector to the query coordinator (QC). The QC receives the partition mapping vectors from the producer server processes, merges the vectors, and determines a skew result based on the merged mapping vectors and sends the skew result to the producer server processes. The producer server process can alter distribution of skewed partitions based on the skew result.

15 Claims, 8 Drawing Sheets

(56) References Cited

U.S. PATENT DOCUMENTS

| | | |
|---|---|---|
| 2011/0137917 A1 | 6/2011 | Boland et al. |
| 2013/0006965 A1 | 1/2013 | Barbas |
| 2014/0181072 A1 | 6/2014 | Wong |
| 2014/0279853 A1* | 9/2014 | Grondin ................ G06F 16/278 |
| | | 707/722 |
| 2015/0088919 A1 | 3/2015 | Hunter et al. |
| 2017/0272503 A1* | 9/2017 | Kesselman ........... G06F 3/0641 |
| 2021/0342785 A1* | 11/2021 | Mann .................... G06F 40/186 |
| 2024/0193227 A1* | 6/2024 | Jain ......................... G06F 17/16 |

OTHER PUBLICATIONS

U.S. Appl. No. 14/033,358, filed Sep. 20, 2013, Final Office Action.
U.S. Appl. No. 14/033,358, filed Sep. 20, 2013, Advisory Action.
Hunter, U.S. Appl. No. 14/033,358, filed Sep. 20, 2017, Interview Summary.
Hunter, U.S. Appl. No. 14/033,358, filed Sep. 20, 2013, Office Action.
Hunter, U.S. Appl. No. 14/033,358, filed Sep. 20, 2013, Interview Summary.
Hunter, U.S. Appl. No. 14/033,358, filed Sep. 20, 2013, Final Office Action.
MSDN Library, "Dimension Set Entries", Microsoft Dynamics NAV 2013 Documentation, http://msdn.microsoft.com:80/en-us/library/hh169155(v=nav.70).aspx, dated Nov. 21, 2012, retrieved on Sep. 13, 2017, 22 pages.

* cited by examiner

FIG. 4

| Operation | Object |
|---|---|
| ○▲ INSERT STATEMENT | |
| ○ ▲ PX COORDINATOR (SEL#1) | |
| ☐ ▲ PX SEND QC (RANDOM) | :TQ10001 |
| ☐ ▲ LOAD AS SELECT (HIGH WATER MARK BROKERED) | LJ_CATALOG_SALES |
| ☐ ▲ OPTIMIZER STATISTICS GATHERING | |
| ☐ ▲ PX RECEIVE | |
| ▨ ▲ PX SEND RANDOM LOCAL (SKEW) | :TQ10000 |
| ▨ ▲ PX BLOCK ITERATOR | |
| ▨ TABLE ACCESS FULL (SEL$1) | ET_CATALOG_SALES |

○ QC    ▨ Producer server process    ☐ Consumer server process

FIG. 5

| Operation | Object |
|---|---|
| ○▲ CREATE TABLE STATEMENT | |
| ○ ▲ PX COORDINATOR (SEL#1) | |
| ☐ ▲ PX SEND QC (RANDOM) | :TQ10001 |
| ☐ ▲ LOAD AS SELECT (HYBRID TSM/HWMB) | LITEM_TARGET_SKEW |
| ☐ ▲ OPTIMIZER STATISTICS GATHERING | |
| ☐ ▲ PX RECEIVE | |
| ▨ ▲ PX SEND RANDOM LOCAL (SKEW) | :TQ10000 |
| ▨ ▲ PX BLOCK ITERATOR | |
| ▨ TABLE ACCESS FULL (SEL$1) | LITEM_SOURCE_SKEW |

○ QC    ▨ Producer server process    ☐ Consumer server process

FIG. 7

| Operation | Object |
|---|---|
| ○ ◢ SELECT STATEMENT | |
| ○     ◢ SORT AGGREGATE (SEL$58A6D7F6) | |
| ○        ◢ PX COORDINATOR | |
| ☐           ◢ PX SEND QC (RANDOM) | :TQ10002 |
| ☐             ◢ SORT AGGREGATE | |
| ☐               ◢ HASH JOIN | |
| ☐                 ◢ PART JOIN FILTER CREATE | :BF0000 |
| ☐                   ◢ PX RECEIVE | |
| ▨                     ◢ PX SEND HASH LOCAL (SKEW) | :TQ10000 |
| ▨                       ◢ PX BLOCK ITERATOR | |
| ▨                         TABLE ACCESS FULL (SEL$...) | T_BUILD |
| ☐                   ◢ PX RECEIVE | |
| ▨                     ◢ PX SEND HASH LOCAL | :TQ10001 |
| ▨                       ◢ PX BLOCK ITERATOR | |
| ▨                         TABLE ACCESS FULL (SEL$...) | T_PROBE |

○ QC     ▨ Producer server process     ☐ Consumer server process

HANDLING DATA SKEW FOR PARALLEL EXECUTION WITH SERVER MAPPING PLANS

FIELD OF THE INVENTION

The present invention relates to parallel execution with partition and server mapping. More particularly, the present invention relates to data skew aware scaling of query plans with mapping of partitions to parallel server processes.

BACKGROUND

Parallel execution is the ability to apply multiple processor and input/output (I/O) resources to the execution of a single statement, such as a Structured Query Language (SQL) statement by using multiple computer system processes, referred to herein as servers or server processes herein. Parallel execution dramatically reduces response time for data-intensive operations on large databases often associated with a decision support system (DSS) and data warehouse. As another example, parallel execution can be implemented on an online transaction processing (OLTP) system for batch processing or schema maintenance operations, such as index creation. Parallel execution may improve processing for:
  queries requiring large table scans, joins, or partitioned index scans;
  creation of large indexes;
  creation of large tables, including materialized views; or,
  bulk insertions, updates, merges, and deletions.

Parallel execution is beneficial when a query references a large data set, there is low concurrency, or elapsed time is important.

Parallel execution uses a producer/consumer model. A parallel execution plan is carried out as a series of producer/consumer operations. Parallel execution (PX) server processes that produce data for subsequent operations are called producers or send-side server processes. A query coordinator (QC), also referred to as a PX coordinator, is the session that initiates the parallel execution and coordinates the producer/consumer operations. PX server processes that require the output of other operations are called consumers or receive-side server processes. Each producer or consumer parallel operation is performed by a set of PX server processes called PX server sets. The number of PX servers in a PX server set is called the Degree of Parallelism (DOP).

Query optimizers attempt to leverage partitioning during query execution plan generation to minimize data transmission and to have a higher likelihood for in-memory operations. However, these schemes do not scale well when the number of partitions is small compared to the degree of parallelism. Parallel query server mapping is used in cases where the number of partitions is smaller than the possible DOP. Without server mapping, the DOP of partition-based operations is limited to the number of partitions accessed. In other words, there is a one-to-one mapping of partitions to server processes. To achieve higher parallelism, the data may be sub-partitioned further, which results in increased overhead for customers, who may decide not to use partition-based operations and alternatively use hash-based operations instead. On the other hand, using hash-based operations negates the benefits of the higher degree of parallelism with sever costs related to redistribution of data. Server mapping allows the database server engine to use a higher degree of parallelism for partition-based operations, such as loads, joins, etc.

When using server mapping, the server set is divided into groups called "server groups." All server processes in a server group are collocated in a single instance. These server groups work on one or a subset of partitions involved in that operation. The intent of this technique is to leverage the partitioning layout of the underlying objects to avoid the communication overhead by not using the interconnect to redistribute the data and keep the communication local to an instance. Using this technique, redistribution of data across the interconnect is avoided, and a higher degree of parallelism is achieved without having to sub-partition the data further.

Server mapping techniques are generally identified using "LOCAL" and "PARTITION KEY" keywords in the execution plan. These keywords refer to the idea that the communication is local within an instance and partition-based distributions. The mapping between server groups and partitions is static, and this can result in significant degradation in performance if there is skew in a partition.

There are two types of possible partition skew:
  1. Skew due to partition pruning: This issue is observed for joins utilizing server mapping techniques. Based on the data observed on the build side, the probe side will only access partitions that will participate in the join. This can lead to server groups with no partitions to work on or "idle groups" leading to poor query execution.
  2. Skew due to partition sizes: This issue is observed for both joins and load operations utilizing server mapping techniques. If any partition is substantially larger than the other partitions participating in the load or join operation, this will overload a single server group. In extreme cases, the database system engine disables server mapping. In less extreme cases, the database system engine continues to use the server mapping techniques, because the cost of redistribution of data over the interconnect is quite severe.

Data skew in partitions results in a subset of the partitions dominating execution of the operation, because the server processes mapped to the skewed partition have many more rows to process than server processes mapped to the other partitions. Thus, there is a need to address partition skew issues mentioned above for load scalability and for joins using server mapping techniques.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 4 illustrates a query execution plan generated by a database management system for inserting data from a source table into a partitioned table using a runtime solution for load scalability in accordance with an illustrative embodiment.

FIG. 5 illustrates a query execution plan generated by a database management system for creating a partitioned table from a source table using a runtime solution for load scalability in accordance with an illustrative embodiment.

FIG. 7 illustrates a query execution plan generated by a database management system for parallel execution of a join operation using a runtime solution for handling skew resulting of partition pruning in accordance with an illustrative embodiment.

DETAILED DESCRIPTION

Figure 1:
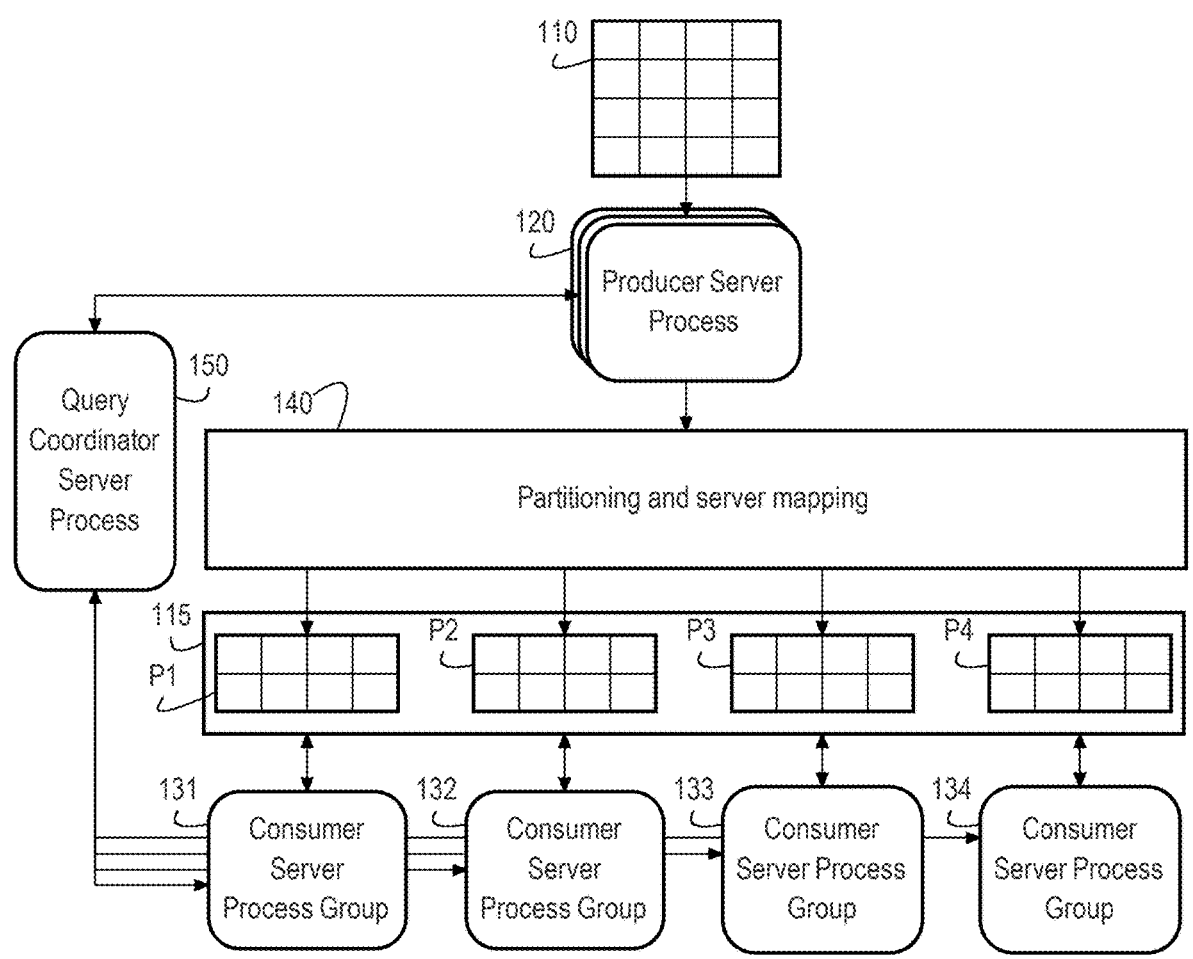
FIG. 1 is a block diagram illustrating parallel execution with partitioning and server mapping in accordance with an illustrative embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

The illustrative embodiments provide solutions at query compilation and execution to detect skew and to deal with skew by readjusting the server mapping, disabling server mapping, or continuing with original server mapping if skew is detected within tolerable limits.

For parallel loads in parallel data manipulation language (DML) statements, if the source is a table, then an embodiment issues a dynamic sampling query at compile time to detect partition skew. The dynamic sampling query can adaptively obtain good samples and produce the partition numbers that are mapped to the destination table and the number of rows for each mapped partition. The embodiment determines the number of skewed partitions and uses a hybrid distribution scheme where skewed partitions use a random distribution and non-skewed partitions use the original server mapping.

For parallel loads when the compile-time solution is not feasible, then an embodiment uses a runtime solution to obtain load scalability. The producer server processes create partition mapping vectors that contain partition mapping information. Each producer server process initiates a barrier protocol with the query coordinator (QC) and sends its partition mapping vector to the QC. In accordance with the embodiment, the QC receives the partition mapping vectors from the producer server processes and merges the vectors. The QC then determines a skew result based on the merged mapping vectors and sends the skew result to the producer server processes. If the skew result indicates that there is skew, then the producer server process randomizes rows in the skewed partitions, thus enqueuing the rows of the skewed partitions randomly among all consumer server processes rather than using the original server mapping.

For joins using server mapping skew handling, an embodiment provides a skew management technique that is used for hash local and broadcast local distributions. While processing the build side of the join, each producer server process buffers the rows that it has produced so far. Based on these rows, the producer server process generates a partition mapping vector to indicate the partitions that are participating in the join on the probe side. When the buffering threshold is reached, or the left input scan is complete, whichever occurs first, the producer server process initiates a barrier protocol with the QC and sends its partition mapping vector to the QC. In accordance with the embodiment, the QC receives the partition mapping vectors from the producer server processes and merges the vectors. Based on the merged partition mapping vector, the QC makes one of three choices:

1. No skew detected: Use current server mapping. The unpruned partitions are substantially equally divided among the server groups, and all server groups have work to do.
2. Extreme skew detected: Disable the server mapper. Most of the partitions are pruned out, and the work is not enough to keep all server groups busy. The server mapper is disabled, and query plan is switched to a hash or broadcast distribution instead of the hash local or broadcast local distribution, respectively.
3. Moderate skew detected: Rebuild the server mapper. The unpruned partitions have work for all server groups; however, the distribution of the work is not even among the server groups based on partition sizes. In this case, the embodiment rebuilds the server mapper and rebuilds the partition and server group mapping to make the distribution more even.

The illustrative embodiments provide even load balancing and scaling. With the data skew handling techniques of the embodiments, performance is greatly improved. There is a minimal overhead in the runtime solutions because query servers buffer a certain number of rows; however, this overhead is insignificant relative to the performance and scaling benefits. The compile-time solution addresses the issue of overhead by avoiding plan adaptation at runtime.

Partitioning and Parallel Execution

Partitioning provides support for very large tables and indexes by subdividing them into smaller and more manageable pieces called partitions, which are entirely transparent to an application. Partitioning is useful for many different types of applications, particularly applications that manage large volumes of data. OLTP systems often benefit from improvements in manageability and availability, while data warehousing systems benefit from performance and manageability.

Each row in a partitioned table is unambiguously assigned to a single partition using a key. The partitioning key consists of one or more columns that determine the partition where each row is stored. Insert, update, and delete operations are directed to the appropriate partition based on the partitioning key. There are three fundamental data distribution methods as basic partitioning strategies that control how data is placed into individual partitions. These strategies include: range, hash, and list. Range partitioning maps data to partitions based on ranges of values of the partitioning key that are established for each partition. Hash partitioning maps data to partitions based on a hashing algorithm that is applied to the partitioning key. List partitioning enables explicit control over how rows map to partitions by specifying a list of discrete values for the partitioning key in the description for each partition.

Parallel execution provides specific advantages to optimize resource utilization and minimize execution time. Parallel execution is the ability to apply multiple CPU and I/O resources to the execution of a single SQL statement by using multiple processes. Parallel execution is sometimes called parallelism. Parallelism is the idea of breaking down a task so that, instead of one process doing all of the work in a query, many processes do part of the work at the same time. An example of this is when four processes combine to calculate the total sales for a year, each process handles one quarter of the year instead of a single process handling all four quarters by itself. The improvement in performance can be quite significant.

Each SQL statement undergoes an optimization and parallelization process when it is parsed. If the statement is determined to be executed in parallel, then the following steps occur in the execution plan:

1. The user session or shadow process takes on the role of a coordinator, often called the query coordinator (QC) or the parallel execution (PX) coordinator. The QC is the session that initiates the parallel SQL statement.
2. The QC obtains the necessary number of processes called parallel execution (PX) servers. The PX servers are the individual processes that perform work in parallel on behalf of the initiating session.
3. The SQL statement is executed as a sequence of operations, such as a full table scan or an ORDER BY clause. Each operation is performed in parallel if possible.
4. When the PX servers are finished executing the statement, the PX coordinator performs any portion of the work that cannot be executed in parallel. For example, a parallel query with a SUM( ) operation requires adding the individual subtotals calculated by each PX server.
5. Finally, the PX coordinator returns the results to the user.

Parallel execution uses a producer/consumer model. A parallel execution plan is carried out as a series of producer/consumer operations. Parallel execution (PX) servers that produce data for subsequent operations are called producer server processes, PX servers that require the output of other operations are called consumer server processes. Each producer or consumer parallel operation is performed by a set of PX server processes called PX server sets. The number of PX server processes in PX server set is called Degree of Parallelism (DOP). The basic unit of work for a PX server set is called a data flow operation (DFO).

The basic unit of work in parallelism is a called a granule. Parallel execution divides an operation executed in parallel, such as a table scan or table creation from an external data source, into granules. Parallel execution (PX) server processes execute the operation one granule at a time. The number of granules and their sizes correlate with the degree of parallelism (DOP). The number of granules also affects how well the work is balanced across PX servers. When partition granules are used, a PX server process works on an entire partition or sub-partition of a table.

A distribution method is a method by which data is sent (or redistributed) from one PX server set to another. The following are the most commonly used distribution methods in parallel execution:

Hash Distribution: The hash distribution method uses a hash function on one or more columns in the row which then determines the consumer where the producer should send the row. This distribution attempts to divide the work equally among consumers based on hash values.

Broadcast Distribution: In the broadcast distribution method, each producer sends all rows to all consumers. This method is used when the result set of the left side in a join operation is small and the cost of broadcasting all rows is not high. The result set from the right side of the join does not need to be distributed in this case; consumer PX server processes assigned to the join operation can scan the right side and perform the join.

Range Distribution: Range distribution is mostly used in parallel sort operations. In this method each producer sends rows that have a range of values to the same consumer.

Partition Key: Key distribution ensures result sets for individual key values are grouped together. This is an optimization that is primarily used for partial partition-wise joins to ensure only one side in the join has to be distributed.

Hybrid Hash Distribution: Hybrid hash is an adaptive distribution method used in join operations. The actual distribution method is decided at runtime by the optimizer depending on the size of the result set from the left side of the join. The number of rows returned from the left side is counted and checked against a threshold value. When the number of rows is less than or equal to the threshold value, broadcast distribution is used for the left side of the join, and the right side is not distributed as the same consumer PX server processes assigned to the join operation scan the right side and perform the join. When the number of rows returned from the left side is higher than the threshold value, hash distribution is used for both sides of the join.

To determine the distribution method, the parallel execution (PX) coordinator examines each operation in a SQL statement's execution plan and then determines the way in which the rows operated on by the operation must be redistributed among the PX servers.

To execute a query in parallel, Oracle Database generally creates a set of producer server processes and a set of consumer server processes. The producer server processes retrieve rows from tables or other external data sources, and the consumer server processes perform operations such as join, sort, DML, and DDL on these rows. Each server process in the producer set has a connection to each server process in the consumer set.

Server Mapping

Parallel query server mapping is used in cases where the number of partitions is smaller than the possible DOP. Server mapping allows the database server engine to use a higher degree of parallelism for partition-based operations, such as loads, joins, etc. When using server mapping, the server set is divided into groups called "server groups." For example, if there are four partitions and sixteen server processes, then each partition can be mapped to a server group of four server processes. All server processes in a server group are collocated in a single instance. These server groups work on one or a subset of partitions involved in that operation.

FIG. 1 is a block diagram illustrating parallel execution with partitioning and server mapping in accordance with an illustrative embodiment. A user session receives a query or relational statement to perform an operation, such as load or join operation. The user session takes on the role of query coordinator server process, referred to herein as the query coordinator (QC) or the parallel execution (PX) coordinator. The QC 150 is the session that initiates the parallel SQL statement. For example, QC 150 initiates a parallel load or scan from a data source 110 into a partitioned table 115. The parallel load may be executing a CREATE statement to create partitioned table 115 from data source 110. In this case, data source 110 may be one or more source data files in a structured format, such as extensible markup language (XML), JavaScript object notation (JSON), comma delimited values (CDV), etc. Alternatively, the parallel load may be executing an INSERT statement to insert rows from data source 110 into a partitioned table 115. In this case, the data source 110 may be a table, row source, materialized view, or data frame. In another example, the operation may be a build-side or probe-side scan of data source 110 for a parallel join operation on two tables.

The QC server process 150 obtains the necessary number of processes called parallel execution (PX) servers, including producer server processes 120 and consumer server process groups 131-134. Parallel execution (PX) servers that produce data for subsequent operations include producer server processes 120, and PX servers that require the output of other operations include consumer server process groups 131-134.

In one embodiment, the query execution plan involves performing a table scan on a source table 110. QC server process 150 dynamically divides the source table 110 into load units called granules, using partitioning and server mapping 140, and each granule is read by a producer server process 120. The granules are generated by the QC server process 150. Each granule is a range of physical blocks of source table 110. When a producer server process 120 finishes reading the rows of the table corresponding to a granule, it gets another granule from the QC server process if there are any granules remaining. This continues until all granules are exhausted and the entire table 110 has been read.

To illustrate intra-operation parallelism and inter-operation parallelism, consider the following statement, query Q1:
SELECT*FROM employees ORDER BY employee_id;

The execution plan implements a full scan of the employees table followed by a sorting of the retrieved rows based on the value of the employee_id column. For the sake of this example, assume the last name column of the employees table is not indexed. Also assume that the degree of parallelism for the query is set to four, which means that four PX servers can be active for any given operation. Thus, in this example, as depicted in FIG. 1, there are four producer server processes 120 and four consumer server process groups 131-134, each having one server process.

Each of the two operations (scan and sort) performed concurrently is given its own set of PX servers: producer server processes 120 for the scan and consumer server process groups 131-134 for the sort. Therefore, both operations have parallelism. Parallelization of an individual operation where the same operation is performed on smaller sets of rows by PX servers achieves what is termed intra-operation parallelism. When two operations run concurrently on different sets of PX servers with data flowing from one operation into the other, inter-operation parallelism is achieved. In the depicted example, there are actually eight PX servers involved in the query (e.g., four producer server processes 120 and four consumer sever process groups 131-134 of one process each) even though the degree of parallelism is four. This is because a parent and child operator can be performed at the same time (inter-operation parallelism).

Partitioning and server mapping 140 are determined based on the query and the execution plan. Note that all of the producer server processes 120 involved in the scan operation send rows to the appropriate consumer server process groups 131-134 performing the sort operation according to the partitions P1-P4 of table 115, based on partitioning and server mapping 140. In the above example, if a row scanned by a producer server process contains a value for the ename column between A and G, thus falling into partition P1 of table 115, then that row is sent to the first ORDER BY consumer server process group 131. If a row scanned by a producer server process contains a value for the ename column between U and Z, thus falling into partition P4 of table 115, then that row is sent to the last ORDER BY consumer server process group 134. When the scan operation is complete, the sorting processes can return the sorted results to QC server process 150, which then returns the complete query results to the user.

Server mapping techniques can be identified using a "LOCAL" and "DISTRIBUTION KEY" keyword in the execution plan. The "LOCAL" keyword refers to the idea that the communication is local within an instance, and the "PARTITION KEY" keyword refers to a partition-based distribution. More specifically, a "RANDOM LOCAL" keyword indicates that the number of PX server processes is greater than the number of partitions. Thus, while the "RANDOM" keyword indicates that rows can be sent randomly to any consumer server process, the "LOCAL" keyword limits the distribution to consumer server processes that are local to an instance. A server group of consumer server processes can be mapped to a given partition. These server processes are then collocated on the same instance, i.e., local. With the "RANDOM LOCAL" keyword, the producer server process randomly sends rows to the consumer server processes that are mapped to the given partition and local to each other.

In the example shown in FIG. 1, the "RANDOM LOCAL" keyword can be used when the number of processes in a consumer server process group is greater than one. For instance, consider each of consumer server process groups 131-134 has four server processes. In this case, rows in partition P1 will be randomly distributed among the processes in consumer server process group 131, rows in partition P2 will be randomly distributed among the processes in consumer server process group 132, rows in partition P3 will be randomly distributed among the processes in consumer server process group 133, and rows in partition P4 will be randomly distributed among the processes in consumer server process group 134.

If the mapping between server process groups and partitions is static, then this can result in significant degradation in performance in the presence of data skew in the partitions. Thus, the illustrative embodiments address partition skew issues for load scalability and join operations using server mapping techniques. These skew handling techniques result in significant improvement in execution performance for partition-based operation utilizing server mapping techniques. The illustrative embodiments provide solutions at query compilation time and at execution time to detect and handle skew by readjusting the server mapping, disabling server mapping, or continuing with the original server mapping if skew is detected within tolerable limits.

Compile-Time Solution

Figure 2:
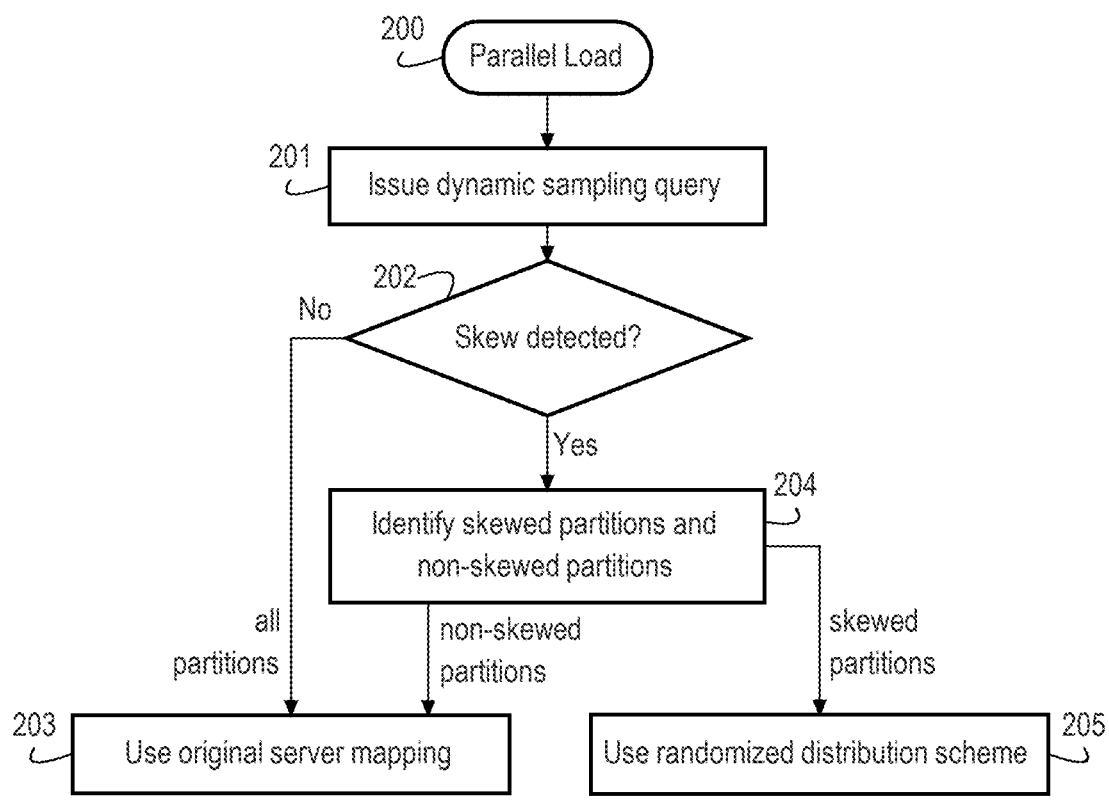
FIG. 2 is a flowchart illustrating a compile-time skew handling technique in accordance with an illustrative embodiment.

In one embodiment, a dynamic sampling query is issued at compile time to detect partition skew. FIG. 2 is a flowchart illustrating a compile-time skew handling technique in accordance with an illustrative embodiment. Operation begins with a parallel load operation (block 200). For parallel loads in parallel DMLs, if the source is a table, then the database system issues a dynamic sampling query at compile time to detect partition skew (block 201). The dynamic sampling query can adaptively obtain good samples and produce the partition numbers that are mapped to the destination table and the number of rows for each mapped partition.

The database system determines whether skew is detected (block 202). For random local distribution and partition key distribution, the database system determines if the rows in the source table are mapped to a subset of partitions in the destination table, or if the rows in the source table are mapped to all partitions in the destination table but a subset of partitions have significantly more rows mapped to them. If the rows are mapped to a subset of partitions or if a subset of partitions have significantly more rows, then skew is detected. In one embodiment, the database system uses a heuristic to determine whether skew is detected based on numbers of rows assigned to partitions, percentages of rows assigned to partitions, ratios of rows assigned to partitions, etc. In an embodiment, the database system uses one or more rules to identify the skewed partitions and non-skewed partitions. For example, the database system may determine that rows of the source are mapped to all partitions of the partitioned target table and that a number of rows mapped to a first subset of partitions is greater than a number of rows mapped to a remainder of the partitions by a predetermined threshold. In an example embodiment, the database system identifies a skewed partition if a number of rows mapped to the partition is at least three times the average number of rows mapped to the other partitions. In another embodiment, the database system uses statistical techniques to identify one or more partitions that are outliers relative to the other partitions.

If skew is not detected (block 202: No), then the database system uses the original server mapping for all partitions (block 203). If skew is detected (block 202: Yes), then the database system identifies skewed partitions and non-skewed partitions (block 204). The database system then uses the original server mapping for non-skewed partitions (block 203) and uses a randomized distribution scheme for the skewed partitions to send rows randomly to all consumer server processes (block 205).

Runtime Solution for Parallel Loads

Figure 3:
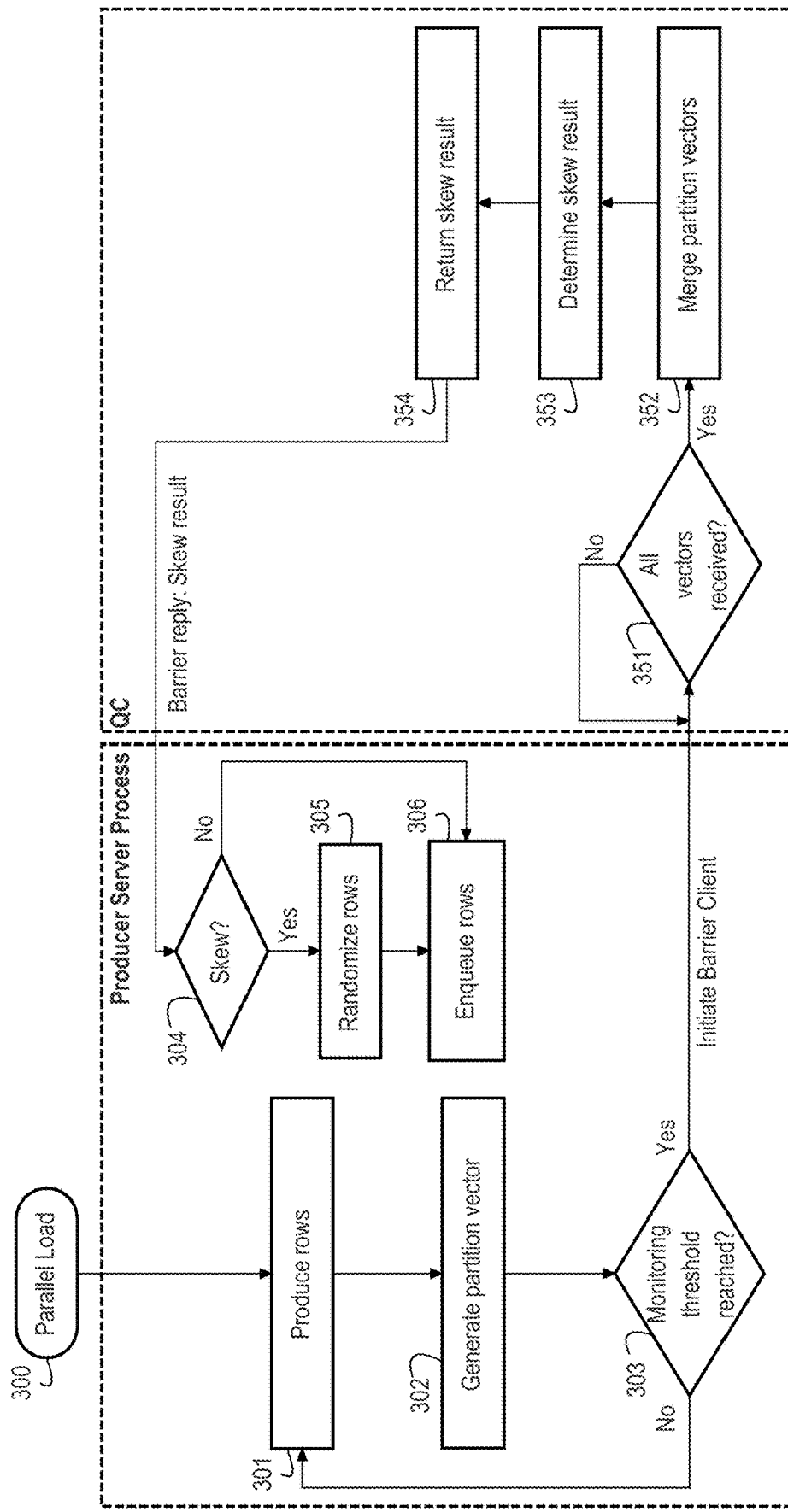
FIG. 3 is a flowchart illustrating a runtime skew handling technique for parallel loads in accordance with an illustrative embodiment.

For parallel loads, if the source is a table, then the compile-time solution is implemented, the QC issues a dynamic sampling query, obtains the skewed partition numbers, and conveys this information to the producer servers scanning the source table. For this case, the runtime solution is not implemented. If a compile-time solution is not feasible (e.g., the data source is not a table that can be sampled), then a runtime solution is implemented to obtain load scalability. In accordance with an embodiment, for the runtime solution, the producer server processes on the sending side create partition mapping vectors that contain partition mapping information. The QC uses the partition mapping vectors from the producer server processes to determine whether skew is detected. FIG. 3 is a flowchart illustrating a runtime skew handling technique for parallel loads in accordance with an illustrative embodiment. Operation begins with a parallel load (block 300). Each producer server process on the sending side produces a row from the data source (block 301) and updates the partition vector with partition mapping information (block 302). In an embodiment, the partition mapping information includes a number of rows in each partition. Thus, the partition mapping vector includes a value corresponding to each server group that represents a number of rows in that partition. That is, for every row produced, the producers see which partition this row belongs to and which server group this partition belongs to and updates the count for that server group. Once the threshold is reached, they send this mapping vector to QC.

The producer server determines whether a monitoring threshold is reached (block 303). Until a threshold number of rows is reached or the entire source is processed, whichever happens first, original server mapping is used to enqueue the rows. If the monitoring threshold is not reached (block 303: No), then operation returns to block 301 to produce the next row. If a monitoring threshold number or rows is reached (or the entire source is processed) (block 303: Yes), the producer server process initiates a barrier client protocol to send its partition vector to the QC.

The QC determines whether all partition vectors are received from the producer server processes (block 351). If all vectors are not received (block 351: No), then operation returns to block 351 until all partition vectors are received. If all vectors are received (block 351: Yes), then the QC merges the partition vectors (block 352) and determines a skew result based on the merged partition vectors (block 353). In one embodiment, the QC merges the partition vectors by adding the values for the number of rows for each server group. The resulting merged partition vector includes a value for each server group, the value representing a total number of rows in that server group produced by all producer server processes. If any of the server process groups does not have any rows, or if all of the server groups have rows mapped to them but a subset of them have significantly more rows, then skew is detected. In an embodiment, the QC uses a heuristic to determine whether skew is detected based on numbers of rows assigned to server groups, percentages of rows assigned to server groups, ratios of rows assigned to server groups, etc. In an embodiment, the QC uses one or more rules to identify the skewed server groups and non-skewed server groups. In another embodiment, the QC uses statistical techniques to identify one or more server groups that are outliers relative to the other server groups. The QC uses a barrier reply to return the skew result to the producer server processes (block 354).

Each producer server process receives the skew result from the QC and determines whether skew is detected (block 304). If skew is not detected (block 304: No), then the producer server process enqueues the rows using the original server mapping (block 306). If a skewed partition is detected (block 304: Yes), then the producer server process randomizes rows of that partition (block 305) and enqueues the rows in that partition using a random distribution to send the rows randomly to all consumer server processes mapped to that partition (block 306). While using a random distribution may result in increased memory usage and communication overhead between processes that are in different instances, this technique for handling skewed partitions increases productivity by more evenly distributing workload among the server processes in the presence of data skew among the partitions.

In some embodiments, the producer server randomizes only a subset of partitions if spilling to disk because of increased memory footprint. That is, the producer server process randomizes only the skewed partitions that can be fit in memory. Even if the QC detects that 10 partitions are skewed and only 4 of them can fit in memory, QC sends only the 4 largest skewed partitions to the producers and only rows that belong to these 4 largest skewed partitions will be randomized. The remaining 6 partitions are enqueued using the original server mapping.

FIG. 4 illustrates a query execution plan generated by a database management system for inserting data from a source table into a partitioned table using a runtime solution for load scalability in accordance with an illustrative embodiment. The query execution plan shown in FIG. 4 corresponds to the following statement, query Q2:

insert/*+append parallel (2)*/into lj_catalog_sales select* from et_catalog_sales;

In this example, the query statement inserts rows from the source table et_catalog_sales into the destination table lj_catalog_sales, which is already partitioned. Note that in the execution plan of FIG. 4, the producer server processes execute a table scan of ET_CATALOG_SALES using a block iterator and executes "PX SEND RANDOM LOCAL (SKEW)" to send the rows to the consumer server processes. This indicates a parallel execution (PX) send of rows from the table scan to the consumer server processes mapped to a partition with skew handling according to the embodiment shown in FIG. 3.

FIG. 5 illustrates a query execution plan generated by a database management system for creating a partitioned table from a source table using a runtime solution for load scalability in accordance with an illustrative embodiment. The query execution plan shown in FIG. 5 corresponds to the following statement, query Q3:

create/*+parallel (2)*/table litem target skew
parallel partition by range (c1_num)
    (partition p1 values less than (101),
        partition p2 values less than (201),
        partition p3 values less than (301),
        partition p4 values less than (401),
        partition p5 values less than (501),
        partition p6 values less than (601),
        partition p7 values less than (701),
        partition p8 values less than (801),
        partition p9 values less than (maxvalue))
    as select * from litem_source_skew;

In this example, the table is partitioned by range, and the partitions are defined by ranges of values for the column c1_num in the query statement. The producer server processes execute a table scan of LITEM_SOURCE_SKEW using a block iterator and executes "PX SEND RANDOM LOCAL (SKEW)" to send the rows to the consumer server processes based on the mapping of server groups to partitions. This indicates a parallel execution (PX) send of rows from the table scan to the consumer server processes mapped to a partition with skew handling according to the embodiment shown in FIG. 3.

Runtime Solution for Parallel Joins

In partition pruning, the optimizer analyzes FROM and WHERE clauses (predicates) in SQL statements to eliminate unneeded partitions when building the partition access list. This functionality enables the database system to perform operations only on those partitions that are relevant to the SQL statement. Partition pruning dramatically reduces the amount of data stored in memory and shortens processing time, thus improving query performance and optimizing resource utilization. Depending upon the actual SQL statement, the database system may use static or dynamic pruning. Static pruning occurs at compile-time, with the information about the partitions accessed beforehand. Dynamic pruning occurs at runtime, meaning that the exact partitions to be accessed by a statement are not known beforehand. A sample scenario for static pruning is a SQL statement containing a WHERE condition with a constant literal on the partition key column. An example of dynamic pruning is the use of operators or functions in the WHERE condition.

Figure 6:
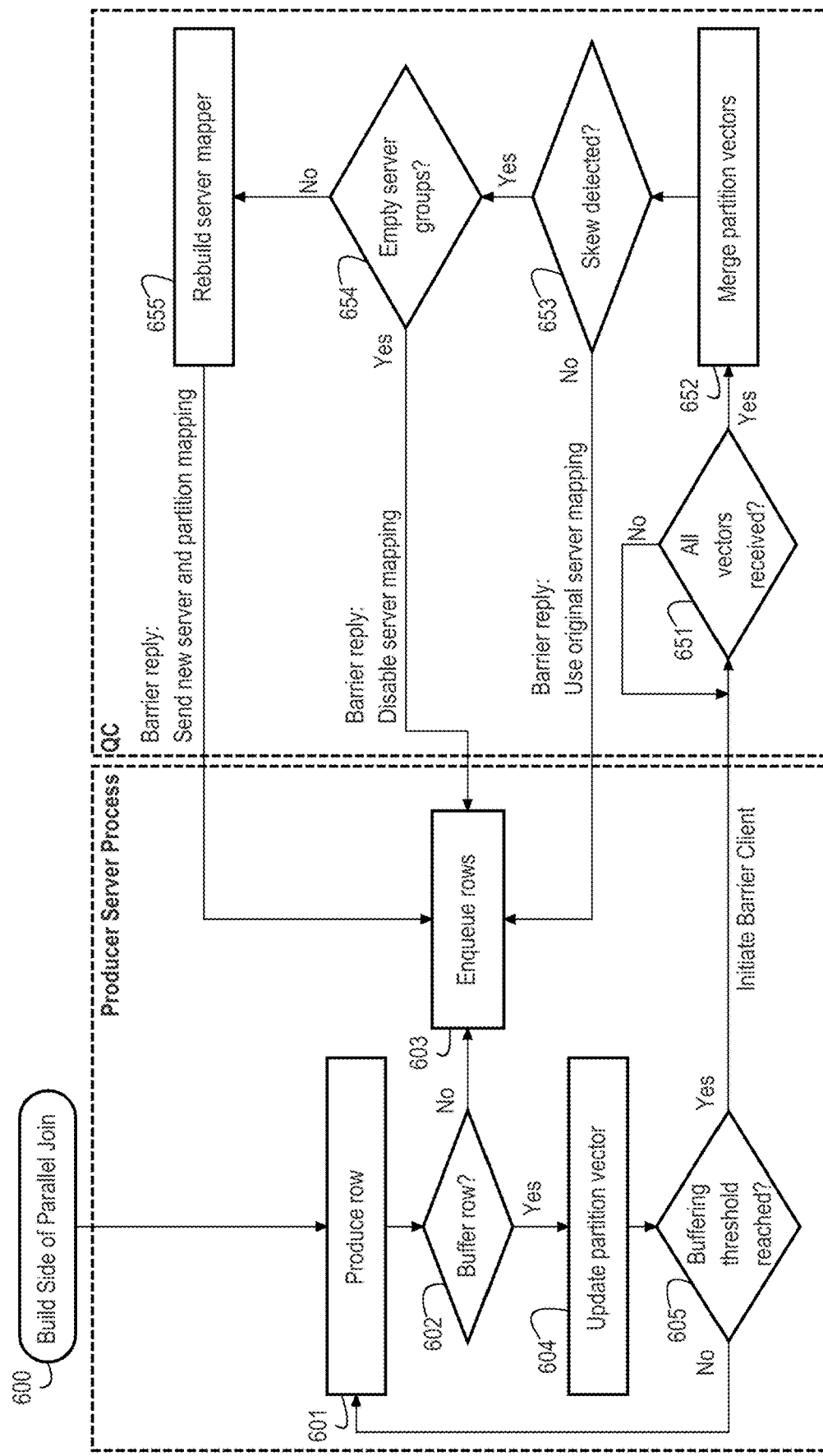
FIG. 6 is a flowchart illustrating a runtime skew handling technique for scanning a build side source in a parallel join in accordance with an illustrative embodiment.

FIG. 6 is a flowchart illustrating a runtime skew handling technique for scanning a build-side source in a parallel join in accordance with an illustrative embodiment. This technique is used for hash local and broadcast local distributions. The build side does not need to be partitioned, but the probe side should be partitioned. For example, say the build side is an employe table and the probe side is a department table. The department table is partitioned on deptno column and the join is on the deptno column. The producers scan the employee table, see the deptno from a row in the employee table, see which partition of the department table this row belongs to, and sends it to the server group that is working on that partition. While processing the build side of the join, the producer server processes buffers the rows that it has gotten so far. Each producer server process creates a partition mapping vector, based on the rows that it has seen, to indicate the partitions that participate in the join on the probe side. The QC merges the partition mapping vectors and uses the merged partition vector to detect skew.

Operation begins with scanning the build-side source for a parallel join (block 600). Each producer server process on the sending side produces a row from the data source for the build side of the join (block 601) and determines whether to buffer the row (block 602). There are two situations in which the producer server process does not buffer: if the producer server process is not using the feature, in which case the producer server process uses the original mapping; and if skew checks have been performed, in which case the producer server process uses one of three techniques, as will be described in further detail below. If the producer server process determines that the row is not to be buffered (block 602: No), then the row is not buffered, and the producer server process enqueues the row (block 603). Every producer buffers until the threshold is reached or it has no more data to process on the build side, whichever happens first. Then, the producer initiates barrier protocol and sends its partition mapping vector to the QC. No row will be enqueued until the barrier reply is received from the QC. Once the barrier reply is received, the producer server process will first enqueue the buffered rows based on QCs barrier reply and then stop buffering and directly enqueue the row using the QC's barrier reply. After receiving the skew result from the QC, there will be no buffering. Any row produced by producer will be directly enqueued based on the barrier reply from the QC.

If the producer server process determines that the row is to be buffered (block 602: Yes), then the row is buffered, and the producer server process updates the partition vector with partition mapping information based on partitions of the probe-side table (block 604). In an embodiment, the partition vector is a bit vector having a first value (e.g., one) if the rows produced participate in the probe side of the join or a second value (e.g., zero) if the rows produced do not participate in the probe side of the join. Because the probe-side table is partitioned based on the join key, if a row is encountered on the build side that corresponds to a given partition on the probe side, then this indicates that the given partition participates in the probe side of the join. Thus, the partition mapping vector includes a value corresponding to each partition that represents whether one or more rows are produced for that partition to participate in the probe side of the join. The producer server process then determines whether a buffering threshold is reached (block 605). If the buffering threshold is not reached (block 605: No), then operation returns to block 601 to produce the next row for the build side of the join. If the buffering threshold is reached (or all rows of the source have been processed) (block 605: Yes), then the producer server process initiates a barrier client to send its partition vector to the QC.

The QC determines whether all partition vectors are received from the producer server processes (block 651). If all vectors are not received (block 651: No), then operation returns to block 651 until all partition vectors are received. If all vectors are received (block 651: Yes), then the QC merges the partition vectors (block 652) and determines whether skew is detected based on the merged partition vectors (block 653). In one embodiment, the QC merges the partition vectors by performing an OR operation on bit vectors received from the producer server processes. The resulting merged partition vector includes a bit value (e.g., one or zero) for each partition, the value representing whether the partition participates in the probe side of the join by virtue of having one or more rows in that partition produced by any producer server process on the build side of the join.

Based on the merged partition mapping vector, the QC can make one of three choices:
1. No skew detected: Use current server mapper. The unpruned partitions are equally divided among the server groups and all groups have work to do.
2. Extreme skew detected: Disable the server mapper. Most of the partitions are pruned out and the work is not enough to keep all of the server groups busy. The server mapper is disabled, and the producer server processes switch to a hash (random) or broadcast distribution instead of hash local or broadcast local distribution, respectively.
3. Moderate skew detected: Rebuild the server mapper. The unpruned partitions have work for all of the server groups; however, the distribution of the work is not even among the server groups checked using the partition sizes. In this case, the QC rebuilds the partitions and server mapping to make the distribution more even.

Thus, if skew is not detected (block 653: No), then the QC uses a barrier reply to instruct the producer server processes to enqueue the buffered rows using the original server mapping (block 603). If skew is detected (block 653: Yes), then the QC determines whether there are empty server groups (extreme skew) (block 654). If there are empty server groups (block 654: Yes), then the QC uses a barrier reply to instruct the producer server processes to disable server mapping and to enqueue the buffered rows using a hash or broadcast distribution rather than a hash local or broadcast local distribution (block 603). If there are no empty server groups (block 654: No), then there is moderate skew, and the QC rebuilds the server mapper and partitioning (block 655). The QC then uses a barrier reply to send the new server and partition mapping to the producer server processes and to instruct the producer server processes to enqueue the buffered rows based on the new mapping (block 603).

FIG. 7 illustrates a query execution plan generated by a database management system for parallel execution of a join operation using a runtime solution for handling skew resulting of partition pruning in accordance with an illustrative embodiment. The query execution plan shown in FIG. 7 corresponds to the following statement, query Q4:
   select/*+pq_map (t2) parallel (8) monitor
      pq distribute (t2 hash hash)
      ordered use hash (t1, t2)*/
   count(*) from
   t_build_np_same_sg_skew t1 inner join t_probe t2
   on t1.c1_num=t2.col1_num order by t2.col1_num;

In this example, the producer server processes on the build side execute a table scan of T_BUILD using a block iterator and execute "PX SEND HASH LOCAL (SKEW)" to use a hash function to send the rows to the consumer server processes based on the mapping of server groups to partitions. This indicates a parallel execution (PX) send of rows from the table scan to the consumer server processes mapped to a partition with skew handling according to the embodiment shown in FIG. 6.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
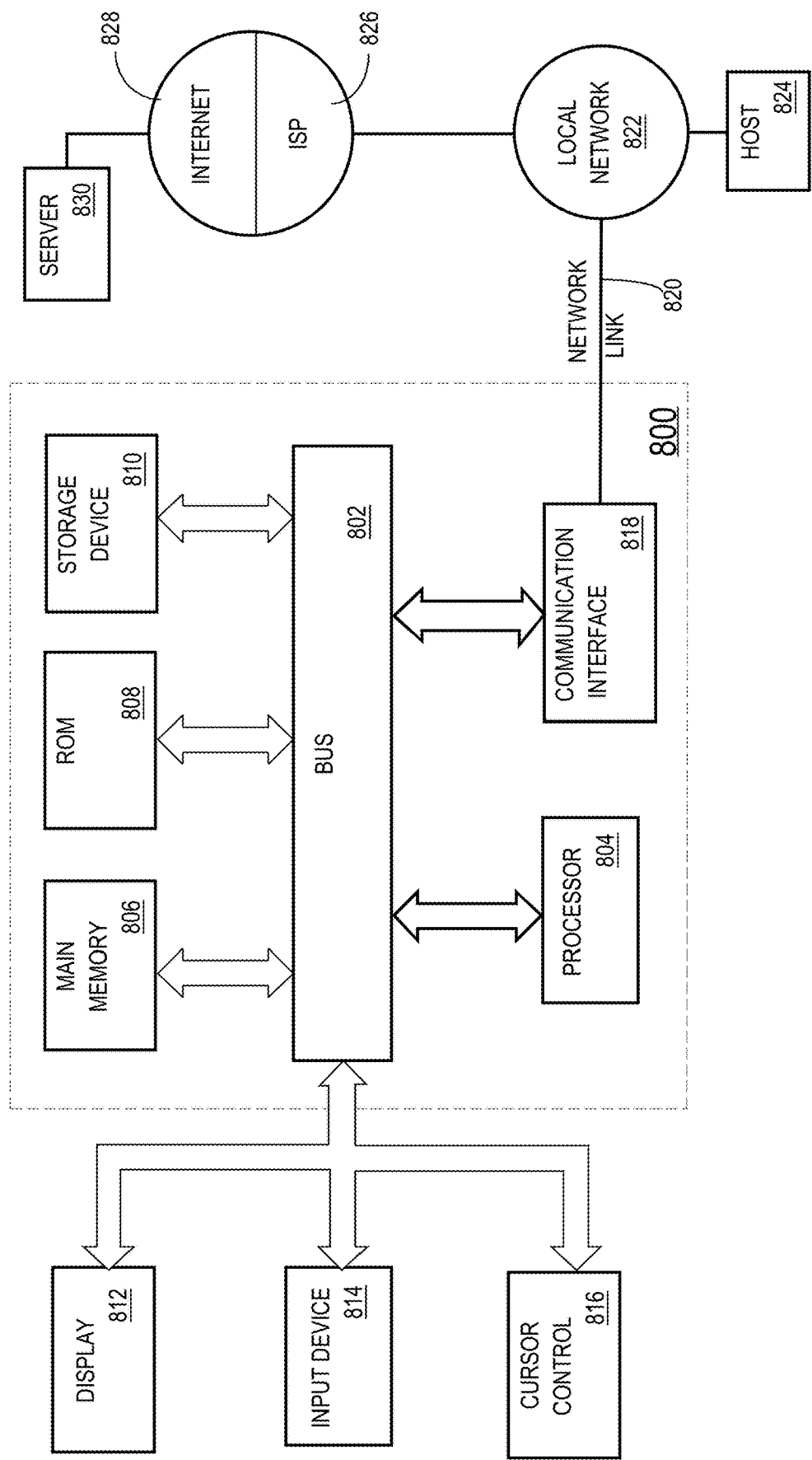
FIG. 8 is a block diagram that illustrates a computer system upon which aspects of the illustrative embodiments may be implemented.

For example, FIG. 8 is a block diagram that illustrates a computer system 800 upon which aspects of the illustrative embodiments may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
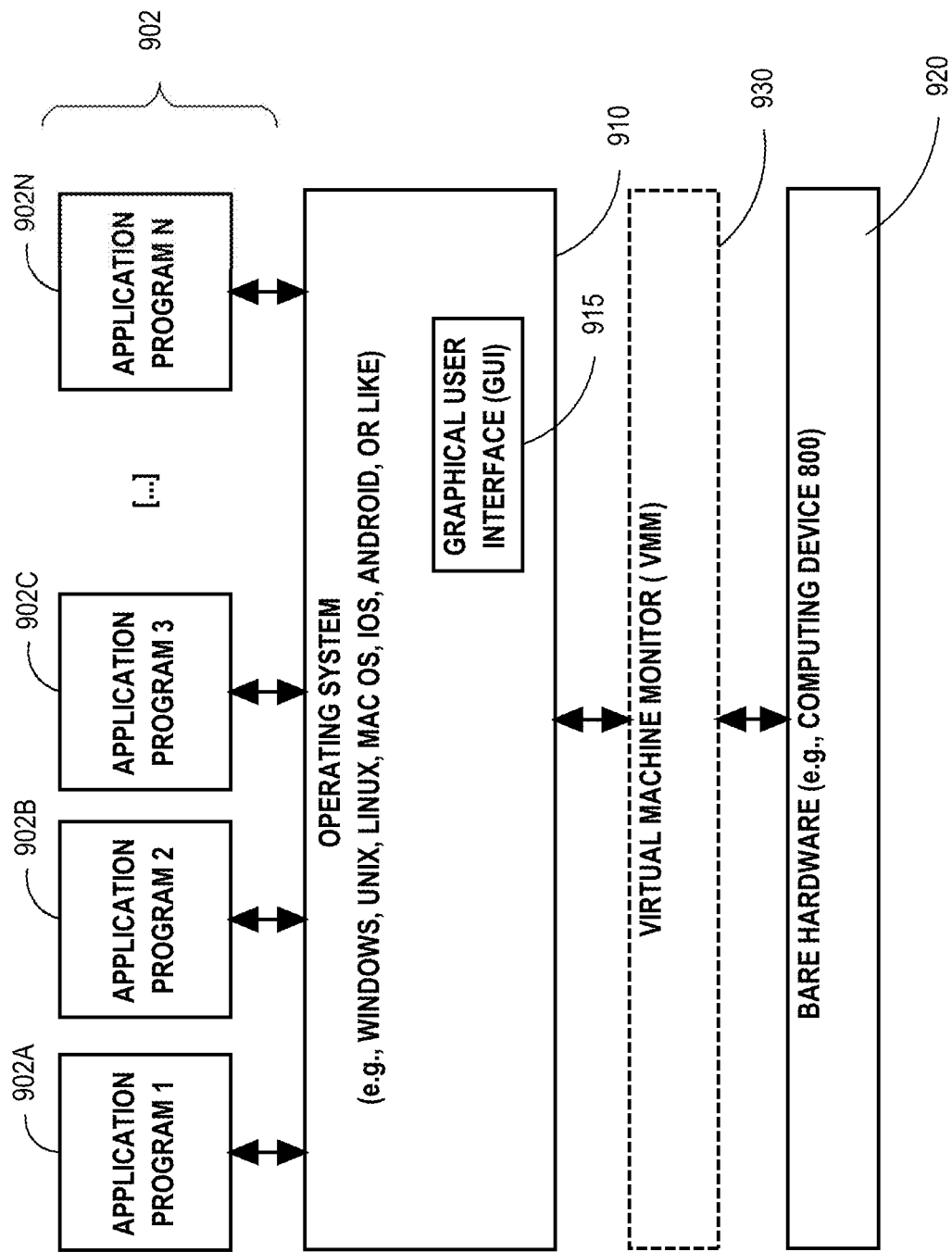
FIG. 9 is a block diagram of a basic software system that may be employed for controlling operation of a computer system upon which aspects of the illustrative embodiments may be implemented.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
executing, by a database server, a statement involving loading rows from a source to a plurality of target partitions using a specified server mapping, wherein:
the server mapping maps partitions of the plurality of target partitions to a set of server processes,
the set of server processes includes a coordinator server process, a set of producer server processes, and a set of consumer server processes,
the set of producer server processes send rows from the source to the set of consumer server processes based on the specified server mapping,
executing the statement comprises:
creating, by each producer server process, a partition mapping vector comprising partition mapping information for each partition of the plurality of target partitions;
receiving, by the coordinator server process, a partition mapping vector from each producer server process;
merging, by the coordinator server process, the partition mapping vectors from the set of producer server processes to form a merged partition mapping vector;
determining, by the coordinator server process, a skew result based on the merged partition mapping vector; and
determining a runtime server mapping based on the specified server mapping and the skew result,
wherein the method is performed by one or more computing devices.

2. The method of claim 1, wherein:
the set of consumer server processes include a plurality of server process groups,
each server process group is mapped to one or more of the partitions, and
each server process group of the plurality of server process groups comprises one or more server processes collocated on a single instance of the database server.

3. The method of claim 1, wherein:
the set of consumer server processes include a plurality of server process groups,
each server process group is mapped to one or more of the partitions,
executing the statement further comprises sending the skew result from the coordinator server process to each server process in the set of producer server processes,
a given producer server process alters a server mapping for rows of a given partition to randomize mapping of rows of the given partition to consumer server processes in a server process group corresponding to the given partition.

4. The method of claim 1, wherein determining the skew result comprises determining that rows of the source are mapped to all partitions of the plurality of target partitions and that a number of rows mapped to a first subset of partitions is greater than a number of rows mapped to a remainder of the partitions by a predetermined threshold.

5. The method of claim 1, wherein the specified server mapping is a random local distribution or a partition key distribution.

6. The method of claim 1, wherein:
the statement specifies a create partitioned table operation, and
each partition mapping vector comprises a row count for each partition.

7. The method of claim 1, wherein:
the statement specifies a join operation of two tables,
each producer server process buffers rows encountered in a build side of the join operation and generates the partition mapping vector based on the buffered rows,
the partition mapping vector comprise a bit vector, and
each bit in the bit vector indicates whether a corresponding partition participates in a probe side of the join operation.

8. The method of claim 1, wherein:
the skew result indicates one of:
no skew is detected,
extreme skew is detected, or
moderate skew is detected,
in response to the skew result indicating no skew is detected, the specified server mapping is used,
in response to the skew result indicating extreme skew is detected, server mapping is disabled, and
in response to the skew result indicating moderate skew is detected, rebuilding the specified server mapping.

9. One or more non-transitory computer-readable media storing instructions which, when executed by one or more processors, causes performance of:
executing, by a database server, a statement involving loading rows from a source to a plurality of target partitions using a specified server mapping, wherein:
the server mapping maps partitions of the plurality of target partitions to a set of server processes,
the set of server processes includes a coordinator server process, a set of producer server processes, and a set of consumer server processes,
the set of producer server processes send rows from the source to the set of consumer server processes based on the specified server mapping,
executing the statement comprises:
creating, by each producer server process, a partition mapping vector comprising partition mapping information for each partition of the plurality of target partitions;
receiving, by the coordinator server process, a partition mapping vector from each producer server process;
merging, by the coordinator server process, the partition mapping vectors from the set of producer server processes to form a merged partition mapping vector;
determining, by the coordinator server process, a skew result based on the merged partition mapping vector; and
determining a server mapping based on the specified server mapping and the skew result.

10. The one or more non-transitory computer-readable media of claim 9, wherein:
the set of consumer server processes include a plurality of server process groups,
each server process group is mapped to one or more of the partitions, and
each server process group of the plurality of server process groups comprises one or more server processes collocated on a single instance of the database server.

11. The one or more non-transitory computer-readable media of claim 9, wherein:
the set of consumer server processes include a plurality of server process groups,
each server process group is mapped to one or more of the partitions,
executing the statement further comprises sending the skew result from the coordinator server process to each server process in the set of producer server processes,
a given producer server process alters a server mapping for rows of a given partition to randomize mapping of rows of the given partition to consumer server processes in a server process group corresponding to the given partition.

12. The one or more non-transitory computer-readable media of claim 9, wherein determining the skew result comprises determining that rows of the source are mapped to all partitions of the plurality of target partitions and that a number of rows mapped to a first subset of partitions is greater than a number of rows mapped to a remainder of the partitions by a predetermined threshold.

13. The one or more non-transitory computer-readable media of claim 9, wherein the specified server mapping is a random local distribution or a partition key distribution.

14. The one or more non-transitory computer-readable media of claim 9, wherein:
the statement specifies a create partitioned table operation, and
each partition mapping vector comprises a row count for each partition.

15. The one or more non-transitory computer-readable media of claim 9, wherein:
the statement specifies a join operation of two tables,
each producer server process buffers rows encountered in a build side of the join operation and generates the partition mapping vector based on the buffered rows,
the partition mapping vector comprise a bit vector, and
each bit in the bit vector indicates whether a corresponding partition participates in a probe side of the join operation.

* * * * *